March 7, 1939. LE ROY A. GRIFFITH 2,150,117

MOTOR CONTROL SYSTEM

Filed Nov. 15, 1937 2 Sheets-Sheet 1

INVENTOR
LeRoy A. Griffith
BY
*George H Fisher*
ATTORNEY

March 7, 1939.  LE ROY A. GRIFFITH  2,150,117
MOTOR CONTROL SYSTEM
Filed Nov. 15, 1937  2 Sheets-Sheet 2
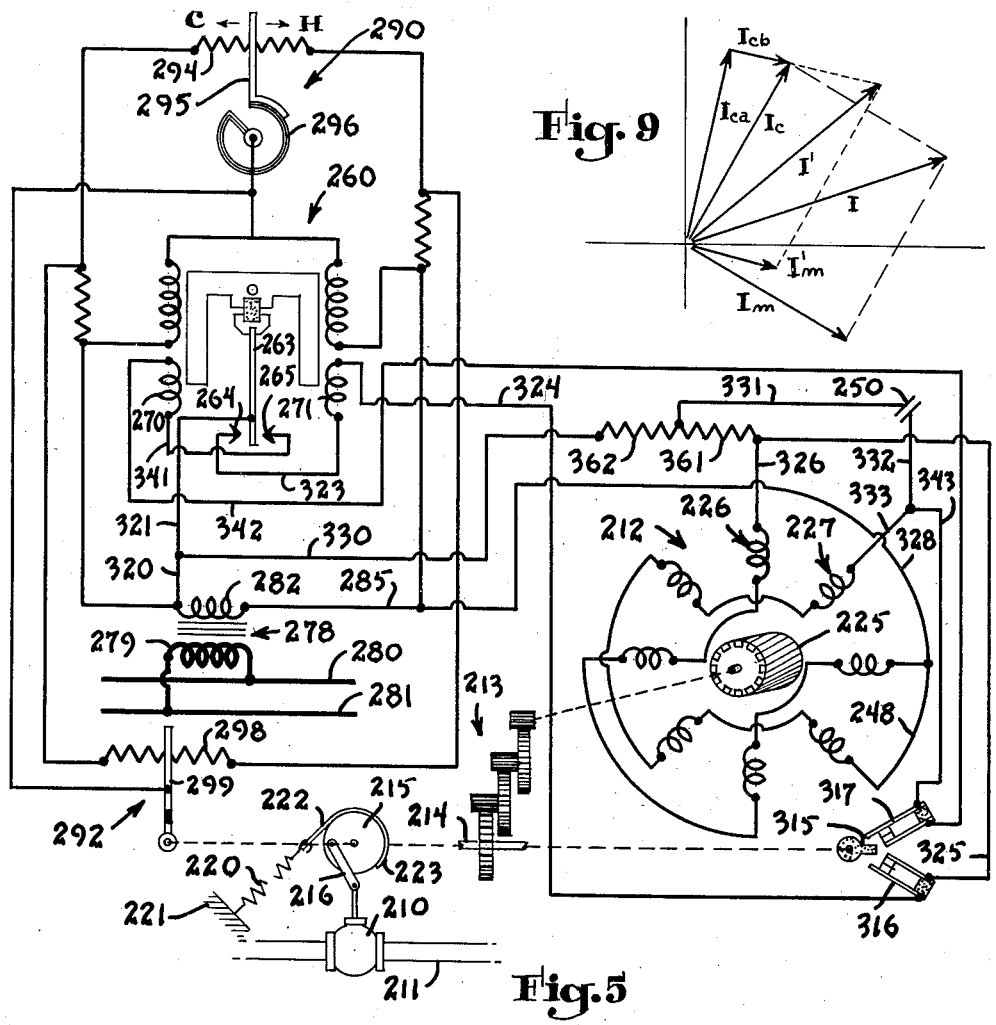
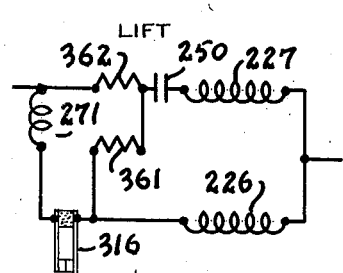
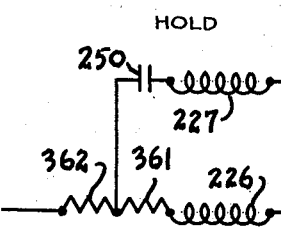
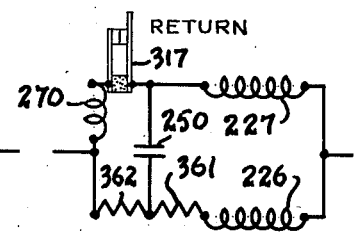
INVENTOR
LeRoy A. Griffith
BY George H Fisher
ATTORNEY Patented Mar. 7, 1939

2,150,117

UNITED STATES PATENT OFFICE 2,150,117

MOTOR CONTROL SYSTEM

Le Roy A. Griffith, Minneapolis, Minn., assignor to Minneapolis-Honeywell Regulator Company, Minneapolis, Minn., a corporation of Delaware Application November 15, 1937, Serial No. 174,520

11 Claims. (Cl. 172—239)

This present invention relates to a motor control system, and more particularly to one wherein the motor is used to position an element biased in one direction.

In the copending application of Willis H. Gille, Serial No. 140,859, filed May 5, 1937, which has matured into Patent No. 2,112,218 issued March 22, 1938, there is disclosed a motor control system for variably positioning an element which is biased to one extreme position. The system of this Gille application is designed to variably position an object in accordance with the position of a controller at a remote point so that the positioned element may assume any desired position. Such a type of system is particularly desirable in condition control systems where the main controller is automatically operated in accordance with the value of some controlling condition and in which the positioned element is a regulator for a condition changing means. In the system shown in the Gille application, the positioned element is a valve in a steam line leading to a radiator and the controller is a thermostatically actuated potentiometer. As pointed out in the previous application, it is highly desirable in such a case that the valve be biased to closed position so that in the event of power failure, the valve will automatically move to a safe position. The need for this feature of the controlled element being biased to a safe position is not, however, limited to the condition controlling art but may occur in any art wherein the operated element is moved from a safe position to a position wherein it is unsafe to leave it continually. In such a system the problem of variably positioning the element is more difficult because of the fact that mere deenergization of the motor will not result in the element remaining in any desired position. In other words, it is necessary to have a definite holding force whenever it is desired that the element remain in a selected position.

In the Gille application, the application of this holding force is accomplished by means of a resistor which, when it is desired that the controlled element remain immovable, is connected in series with both of the windings of the motor. The connection of the resistance results in the torque exerted by the motor becoming insufficient to move the element against its bias, although being sufficient to hold the same against its bias with the aid of the loss in the gear train.

While the system disclosed in the aforementioned Gille application possesses numerous advantages over the prior art systems, it has the defect that it is not adaptable to varying loads.

It will be readily apparent that in view of the fact that only the torque is changed, any great variation in the weight of the operated element will result in either the motor creeping ahead or creeping in the direction of the biased position. In other words, the system must be designed for a particular load.

The present invention has as its object a system of the general type discussed above in which, when the elements are in the position wherein the operated element is held fixed, the motor not only exerts a torque opposing the biasing means but also tends to a marked degree to resist movement of the element in either direction.

This is accomplished by using a two phase induction motor and reducing the phase displacement between the currents of the two windings when it is desired to hold the element. This reduction in phase displacement is accomplished by connecting a resistance in series with one of the windings. The effect of the connection of this resistance in series with this winding is to both reduce the current to the motor and to hence reduce the torque, and to also increase the components of the two currents which are in phase with one another. The effect of the latter is to produce a marked "locking" effect due both to the generator action and to the magnetic braking action. This resistor is, moreover, of further utility. In the specific form of invention, a capacitor motor is employed and when it is desired that the motor move the element in the direction in which it is biased, the condenser is shunted out and the resistance is connected in series with the other winding so that the motor operates as a resistance motor to rotate in the opposite direction.

Further objects of the present invention will be apparent from a consideration of the accompanying specification, claims and drawings, in which Figure 1 is a schematic view of one form of my motor control system;

Figure 5 is a schematic view of a modified form of my invention;

Figures 6, 7, and 8 are schematic views of a portion of the control system in the electrical positions which they occupy when the motor is lifting, holding, and returning the operated element, respectively, and Figure 9 is a vector diagram of the action which occurs when the elements are connected in their "lifting" and "holding" positions.

Figure 1:
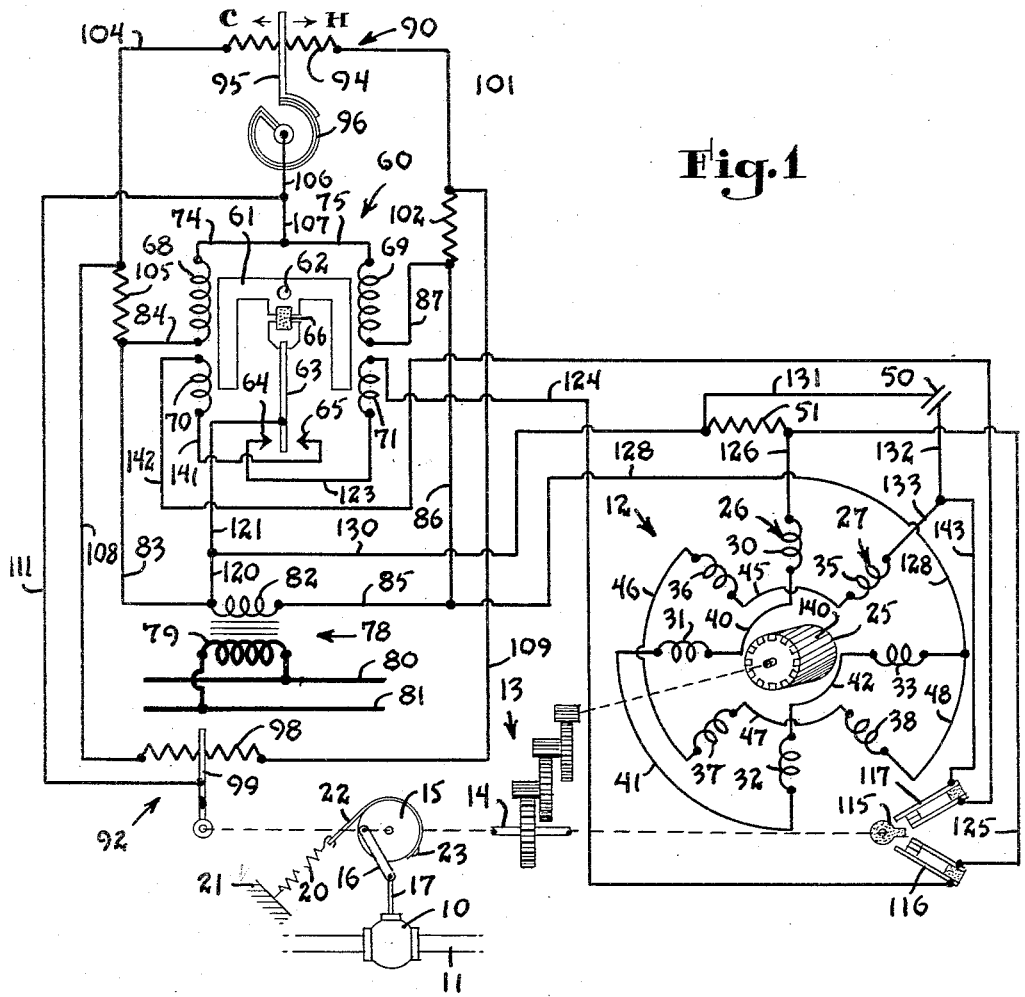

Referring to the drawings for a clearer understanding of the invention, there is schematically shown in Figure 1 one form of my control system applied to the positioning of a valve. The valve in question is indicated by the reference numeral 10, and is shown as controlling the flow of fluid through a pipe line 11 which may desirably be a pipe conveying steam to some suitable heating device. The valve 10 is driven by a motor generally indicated by the reference numeral 12. The motor 12 drives through a reduction gear train 13 a shaft 14 to which is secured a crank disc 15. A link 16 extends between the crank disc and a stem 17 of the valve 10. A spring 20 is secured at one end to a rigid support 21 and at its other end to a strap member 22 which is, in turn, secured at 23 to the crank disc 15. The spring 20 is effective to bias crank disc 15 in a counter-clockwise direction and to, accordingly, bias valve 10 to closed position. Spring 20 is so selected as to exert a sufficient force to return the valve to closed position in the event of power failure, moving therewith the gear train and the rotor of motor 12.

The motor 12 is shown as being a capacitor motor. The motor comprises a squirrel cage rotor 25 and two pairs of field windings 26 and 27. Field windings 26 and 27 each consist of four coils, the motor being shown as a four electrical pole motor. The winding 26 consists of the coils 30, 31, 32, and 33. The winding 27 consists of coils 35, 36, 37, and 38. The coils 30, 31, 32, and 33 of winding 26 are connected by conductors 40, 41, and 42 so that the polarities of alternate windings are opposite to each other. The coils 35, 36, 37, and 38 of winding 27 are connected by conductors 45, 46, 47, and 48 so that the polarities of alternate coils are opposite to one another. It is to be understood that the motor as so far described is a conventional split phase four electrical pole induction motor. Associated with the winding 27 is a condenser 50. Associated with the winding 26 is a resistor 51. As will appear from the subsequent description, condenser 50 is connected in series with winding 27 and resistor 51 in series with winding 26. This is the electrical position assumed by the elements when it is desired to hold the valve against the biasing spring 20. When it is desired to move the element against the bias of the spring, the resistance is shorted out so that the motor operates as a straight condenser motor. When it is desired to return the element in the direction in which it is biased, the condenser is shorted out so that the motor operates as a resistance motor.

A relay generally indicated by the reference numeral 60 is employed to selectively shunt the condenser 50 or the resistor 51, as the case may be. The relay 60 is of the so-called "balanced" type and comprises a U-shaped armature member 61 pivoted at its midpoint 62 and carrying a contact arm 63 adapted to selectively engage contacts 64 and 65. Contact arm 63 is preferably insulated from armature 61 by an insulating member 66. The two legs of the U-shaped armature member 61 are adapted to cooperate with main relay windings 68 and 69, respectively, and booster relay windings 70 and 71, respectively. When relay windings 68 and 69 are equally energized, the relay assumes the position shown. The main relay windings 68 and 69 are so disposed with respect to the legs of the U-shaped armature member 61 that when one of the coils is more highly energized than the other, the corresponding leg of the U-shaped armature is drawn downwardly. Thus if relay winding 68 becomes more highly energized than relay winding 69, the left-hand leg of U-shaped armature 61 is drawn downwardly rotating the armature 61 in a counter-clockwise direction and moving switch blade 63 into engagement with contact 65. On the other hand, when relay coil 69 is more highly energized than relay coil 68, the armature 61 is rotated in a clockwise direction causing switch blade 63 to be moved into engagement with contact 64. The upper ends of the two windings 68 and 69 are connected together through conductors 74 and 75.

A step-down transformer 78 is employed to supply low voltage power for operation of the system. This transformer comprises a line voltage primary 79 connected to line wires 80 and 81 leading to a suitable source of power (not shown). The transformer also has a secondary 82. The opposite terminals of this secondary are connected through conductors 83 and 84 on the one hand, and 85, 86, and 87 on the other hand to the opposite ends of relay coils 68 and 69, respectively. It will be noted that through these connections, the opposite ends of main relay windings 68 and 69 are connected in series across the secondary 82. Thus in the absence of any other controlling means, the two relay windings 68 and 69 would at all times be equally energized. Controlling, however, the relative energizations of the two relay windings 68 and 69 are two potentiometers 90 and 92.

Potentiometer 90 is the controlling potentiometer and consists of a resistance 94 and a contact arm 95 movable thereover. The potentiometer 90 may be controlled in any suitable manner. In the illustrative embodiment of the invention, this arm is actuated in accordance with the temperature of the controlling medium and is secured to a bimetallic element 96 designed to respond to such temperature. The bimetallic element 96 is designed so as to move contact arm 95 to the right upon a temperature rise and to the left upon a temperature fall, as indicated by the legends C and H.

The potentiometer 92 is a follow-up potentiometer and acts to rebalance the energization of relay 60, upon the same being unbalanced by controlling potentiometer 90, after a predetermined movement of the valve has taken place. This potentiometer consists of a resistance element 98 and a contact arm 99 movable thereover. Contact arm 99 is secured to the shaft 14 so as to be movable therewith. When shaft 14 is rotated in a clockwise direction to move valve 10 towards open position, the contact arm 99 is moved to the right and vice versa.

The potentiometers 90 and 92 are connected so as to act as voltage dividers for the main relay coils 68 and 69. The right-hand end of resistance 94 of potentiometer 90 is connected through conductors 101, protective resistance 102, and conductor 87 to one end of relay coil 69. The other end of resistance 94 is connected through conductor 104, resistance 105, and conductor 84 to one end of relay coil 68. The contact arm 95 is connected through bimetallic element 96 and conductors 106 and 107 to the junction of conductors 74 and 75 which, as previously explained, are connected to the inner ends of relay windings 68 and 69. Similarly, the opposite ends of resistance 98 of potentiometer 92 are connected through conductor 108, protective resistance 109, and conductor 84 on the one hand, and conductor 109, protective resistance 102 and conductor 87 on the other hand, to the opposite terminals of relay coils 68 and 69. The contact arm 99 of potentiometer 92 is connected through conductors 111 and 107 with the junction of conductors 74 and 75 connected to the inner ends of relay coils 68 and 69. It will be seen from the above traced connections that the potentiometers 90 and 92 are connected in parallel with each other and through protective resistances 102 and 105 with the relay coils 68 and 69. Thus upon a movement to the right of contact arm 95, the voltage across relay coil 68 is increased relative to that across relay coil 69 so that the energization of relay coil 68 is increased and that of 69 decreased. Similarly, when the contact arm 95 is moved to the left, as occurs when the temperature falls, the energization of relay coil 69 is increased and that of relay coil 68 is decreased. Likewise, when contact arm 99 of potentiometer 92 is moved to the left, the energization of relay coil 69 is increased and that of relay coil 68 is decreased. When the contact arm 99 moves in the opposite direction, the opposite unbalance in the energization of coils 68 and 69 takes place. In view of the parallel connection of potentiometers 90 and 92, any unbalance in energization of relay coils 68 and 69 produced by a change in the position of contact arm 95 can be compensated for by a similar movement in the opposite direction of contact arm 99 of potentiometer 92. In view of the fact that contact arm 99 is moved whenever shaft 14 is rotated, the movement of valve 10 for any given deflection of potentiometer 90 is terminated as soon as such movement corresponds to the amount of such deflection of contact arm 95. The action of this will be more apparent from the subsequent description.

The protective resistances 102 and 105 previously referred to are provided for the purpose of insuring that the secondary 82 is at no time completely short-circuited. It will be obvious that if it were not for these protective resistances such a short circuit condition would exist whenever potentiometer arms 95 and 99 are in their opposite extreme positions.

Secured to the right-hand end of shaft 14 is a crank member 115 of insulating material. This crank member 115 is designed to cooperate with limit switches 116 and 117. Each of these limit switches has a relatively short contact blade and a relatively long contact blade which is adapted to be engaged by the crank member 115 when the valve 10 is moved to an extreme position. The two blades of each limit switch are normally biased into contact making engagement with each other and are separated only upon the engagement of the crank member 115 with the long blade thereof. The purpose of these limit switches is to terminate movement of the motor after the valve reaches either extreme position. The limit switches 116 and 117 are so positioned that the long blade of each switch is adapted to be engaged by the crank member 115 when the valve reaches one of the two extreme positions.

*Operation of species of Figures 1 to 4*

The various elements of the system are shown in Figure 1 of the drawings in the position they assume when the temperature is approximately at the desired value. Let it be assumed that the temperature decreases so as to cause movement of contact arm 95 to the left. When this occurs, relay coil 69 becomes more highly energized than relay coil 68, as previously explained. The result of this is that switch blade 63 is moved into engagement with the contact 64, which results in the following circuits being established to field winding 26; from the left-hand terminal of secondary 82 through conductors 120 and 121, contact arm 63, contact 64, conductor 123, booster relay coil 71, conductor 124, limit switch 116, conductor 125, conductor 126, field winding 26, and conductors 128 and 85 to the right-hand terminal of secondary 82. It will be noted that in the circuit just traced, field winding 26, with the exception of the booster coil 71 which has a relatively low impedance, is connected directly across secondary 82. The current flowing through booster coil 71, which aids relay coil 69, results in an increase in the unbalance in the relay and consequently in an increase in the pressure between blade 63 and contact 64. At the same time, the field winding 27 is energized through the following circuit: from the left-hand end of secondary 82 through conductors 120, 130, and 131, condenser 50, conductors 132 and 133, field winding 27, and conductors 48, 128, and 85 to the right-hand terminal of secondary 82. Thus, field winding 26 is connected substantially directly to the source of power whereas field winding 27 is connected in series with the condenser 50. This connection is most clearly indicated by the connection diagram in Figure 2 wherein the similar elements bear corresponding numerals. It will be noted from this diagram that resistor 51 is effectively shunted by the limit switch 116 and the booster coil 71. Accordingly the motor operates as an ordinary condenser motor, the current through field winding 27 leading that through field winding 26. The motor, under these circumstances, is effective to rotate shaft 14 in a clockwise direction to cause clockwise rotation of crank disc 15, which in turn is effective to move valve 10 towards open position. This movement of valve 10 towards open position admits more steam to the radiator or other steam consuming device, and as a result tends to again raise the temperature to which bimetallic element 96 is subjected.

At the same time as shaft 14 is moved in a clockwise direction causing crank disc 15 to be moved to open the valve, such movement also causes arm 99 to be moved to the right. The effect of this is to change the relative energization of relay coils 68 and 69 in a manner opposite to the change caused by the movement of arm 95 to the left. The result is that after a predetermined amount of movement of the valve has taken place, the arm 99 of potentiometer 92 will have been moved to the right sufficiently far to compensate for the original movement to the left of contact arm 95 and to rebalance the relay 60. When this occurs, contact arm 63 will be moved out of engagement with contact 64.

Upon contact arm 63 moving out of engagement with contact 64, the shunt around resistor 51 will be interrupted. The result is that the energizing circuit to field winding 27 is now as follows: from the left-hand terminal of secondary 82 through conductors 120 and 130, resistor 51, conductor 126, field winding 26, and conductors 128 and 85 to the right-hand terminal of secondary 82. At the same time, the previously traced circuit to field winding 27 through condenser 50 still exists, inasmuch as this circuit was independent of contact arm 63. The result is that the connections will take the form shown in the diagram of Figure 3. From this figure, it is obvious that field winding 27 is connected in series with condenser 50 and field winding 26 is in series with the resistor 51. The effect of this is that the current to winding 26 is reduced in value over that in the previously discussed case, by reason of the resistor 51 being connected in series therewith. Moreover, the fact that all of the current going through winding 26 must pass through resistor 51 results in the phase position of the current through winding 26 being advanced. In other words, the current through winding 26, by reason of the inductance of the winding, normally lags considerably behind the applied voltage. By making a part of the impedance in the form of resistance, this lag is reduced.

The result of the resistor 51 being effectively placed in series with winding 26 is thus twofold. By reason of the shift in phase of the current through winding 26, the torque is reduced as was done in the arrangement of the above mentioned Gille application. In addition, the components of the currents through windings 26 and 27 in phase with each other are increased. This action can perhaps best be understood by reference to the vector diagram of Figure 9. In this diagram $I_c$ represents the current through the condenser winding, or winding 27, $I_m$ represents the current through the main winding when the resistor 51 is shunted out, as in Figure 2, and I represents the total current through the two windings. It is to be noted that there is approximately 90° phase difference between $I_m$ and $I_c$. This is a very desirable condition for securing a large torque. $I_m'$ represents the current passing through winding 26 after the shunt around resistor 51 is broken. It will be noted that the magnitude of this current is materially reduced, and at the same time the phase position thereof has been advanced so that there is now less phase difference between the currents through the main winding and the condenser. The new resultant current is indicated by $I'$. In view of the fact that $I_c$ and $I_m$ extend at practically right angles to one another, there is no component of one which is in phase with the other. As soon, however, as the resistor 51 is effectively connected in series with winding 26 with the result that current $I_m'$ results, it is possible to resolve $I_c$ into two components, one of which is at right angles to $I_m'$ and the other of which is in phase therewith. These two components are represented by the factors $I_{ca}$ and $I_{cb}$, respectively. The components $I_m'$ and $I_{ca}$ are available for the production of torque although the torque produced thereby will obviously be less than the torque produced by $I_m$ and $I_c$. The components $I_m'$ and $I_{cb}$ will cooperate to resist any turning of the rotor. This is due in part to the fact that with the two windings energized with current of like phase, there is no torque but there is a generator action which resists turning of the rotor. In addition to this holding effect which has been referred to as the "generator action", there is also some magnetic holding effort. In view of the fact that this magnetic action is somewhat undesirable in the ordinary operation of a split phase induction motor, the slots of an ordinary squirrel cage motor are usually disposed at an angle to the axis of the rotor, as indicated in the drawings wherein the copper bars are designated by the reference numeral 140. In spite of this angular disposition of the slots and consequently of the magnetic poles extending between these bars, there is still a certain amount of magnetic action still present. Consequently, when there are marked components of the two currents in phase with each other, there is some resistance to turning the rotor at slow speed due to the magnetic attraction between the field poles and the poles of the rotor formed by the portions projecting up between the copper bars.

Accordingly, there are two effects operating to hold the load. One of these is directional and tends to actually move the load. Such movement is resisted by the biasing means. However, in view of the fact that this effect is directional, any great change in the biasing means, if this were the only effect, would result in the valve being moved either forward or backward. However, the second effect resists rotation in either direction so that there may still be a large variation in the weight of the element lifted without causing "creeping" of the element.

Figure 4:
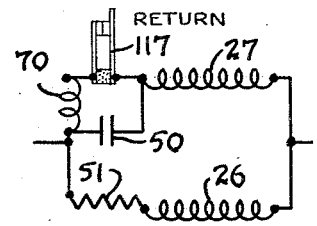

With the valve in the wider open position, more steam is admitted to the radiator and the temperature will gradually rise causing a movement of contact arm 95 to the right. This will result in relay coil 68 becoming more highly energized than relay coil 69 with the result that contact arm 63 is moved into engagement with contact 65. When this occurs, the following circuit is established to field winding 27: from the left-hand end of secondary 82 through conductors 120 and 121, contact arm 63, contact 65, conductor 141, booster coil 70, conductor 142, limit switch 117, conductor 143, conductor 133, field winding 27 and conductors 128 and 85 to the other terminal of secondary 82. At the same time, the previously traced circuit to field winding 26 through resistance 51 will remain effective. The various elements will now be connected as indicated in the diagram of Figure 4. The current flowing through booster winding 70 will aid winding 68 and hence increase the contact pressure between blades 63 and contact 65. Due to the low resistance of the booster coil 70, condenser 50 is effectively shunted. The result is that the current through field winding 27 no longer leads that through field winding 26. In fact by reason of the resistor 51 in series with winding 26, the current through winding 26 actually leads that through winding 27. The result is that a small torque is now produced in the opposite direction, which torque is sufficient to drive the valve towards closed position even if the biasing means 20 should fail for some reason or other. Moreover, this torque is not sufficiently great that the combined actions of the torque and of biasing means 20 will cause the valve to move unduly rapidly towards its seat.

The energization of the motor in the manner just described results in a counter-clockwise rotation of shaft 14, causing valve 10 to be moved towards closed position. At the same time, the arm 99 of potentiometer 92 is moved towards the left so as to affect the relative energizations of coils 68 and 69 in a manner opposite to that in which they were affected by movement to the right of arm 95 of control potentiometer 90. The result is that after a certain amount of movement of valve 10 towards closed position, coils 68 and 69 will again be equally energized so that the contact blade 63 is moved to a position in between the contacts 64 and 65. The movement of valve 10 will thus be terminated after such movement corresponds to the movement of contact 95 which initiated operation of the apparatus.

Figure 2:
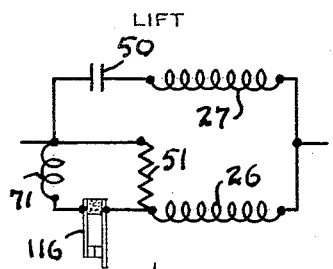
Figures 2, 3 and 4 are schematic views of certain portions of the system in the position which they occupy when the motor is lifting, holding, and returning the operated element, respectively.
Figure 3:
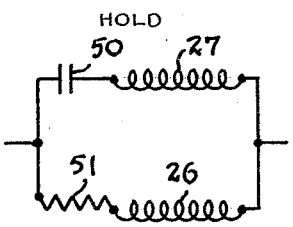

A consideration of Figures 2 and 4 will indicate that whenever either limit switch 116 or 117 is opened, the various elements will be electrically connected, as in Figure 3, so as to hold the valve. Thus if a condition should exist that valve 10 would be moved to the wide open position causing the opening of limit switch 116, the torque would be reduced to a point where there no longer would be any effort to move the valve. In this manner, it is assured that there is no danger of any of the parts becoming jammed. Similarly, when the valve reaches approximately closed position, the limit switch 117 is opened so as to eliminate the torque tending to drive the valve towards closed position. In this way, the driving force of the motor is not only interrupted but is substituted by a force opposing the biasing spring 20 so as to prevent the valve being driven against its seat with excessive force.

It will be seen that with the arrangement of the present invention, the valve is firmly held whenever switch blade 63 is out of engagement with contacts 64 and 65 or whenever one of the limit switches is open. Moreover, by the reason of the twofold nature of this holding action, a large variation in the weight of the valve can be had without disturbing the holding action. This is particularly important where the motor instead of being used to operate a valve is used to operate dampers wherein the weight of the dampers is effective to move the same to closed position upon deenergization of the motor. It will be obvious that the weight of these dampers will vary greatly with different installations and it would be highly undesirable to have to design a different motor for each type of damper. It will be noted, moreover, that this holding action is accomplished by the use of resistor 51 which functions not only to reduce the torque and the phase displacement for holding purposes but also operates to create the necessary phase displacement for running the motor in the opposite direction. In view, moreover, of the relatively small displacement effect of the resistor, this phase displacement is not sufficiently large to create an excessive torque such that the combined actions of the biasing means and the torque will cause the valve to be moved too rapidly to its seat.

*Species of Figures 5 to 8*

In the species of Figures 1 to 4 only one resistance was necessary. This may be possible where the various constants of the motor are such that the use of a single resistor will provide the desired amount of holding action and also the desired amount of return torque. It will be obvious, however, that in the case of certain motors if a resistance were chosen large enough to reduce the torque sufficiently to hold the load properly, such resistance would excessively reduce the current when it was desired to return so that insufficient return torque would be developed to return the load in the event of the biasing means being broken for some reason or other. The species of Figures 5 to 8 is concerned with the use of a combination of two resistors to take care of such a situation. In view of the fact that the elements of Figures 5 to 8 are substantially the same with the exception of the addition of this second resistor, the corresponding elements of Figures 5 to 8 have been assigned reference characters 200 higher than the same elements of Figures 1 to 4. It is believed that their similarity will be sufficiently apparent that there is no need of redescribing these elements in detail in connection with Figures 5 to 8.

In this case, a valve 210 controlling the flow of fluid through a pipe line 211 is positioned by a motor 212 which drives a valve through a gear train 213, a crank-shaft 214, a crank disc 215, and a link 216, as in Figure 1. The operation of the motor is controlled by a relay 260, the energization of which is jointly controlled by a control potentiometer 290 and a rebalancing potentiometer 292. In the present species, any movement of the contact arm 295 of the control potentiometer along the resistance 294 causes movement of the relay contact arm 263 into engagement with either contact 264 or 265. The energization of relay 260 is rebalanced by a movement of contact arm 299 of rebalancing potentiometer 292 along resistance 298 in a direction opposite to that of contact arm 295 which produced the unbalance in energization of relay coil 260.

The motor 212 is of a split phase induction type having two field windings 226 and 227 which cooperate with a squirrel cage rotor 225. A condenser 250 is permanently connected in series with the field winding 227. In lieu of the resistor 51 employed in the preferred species, two resistances 361 and 362 are now employed. The resistance 361 is permanently connected in series with winding 226 whereas resistance 362 is connected in series with both windings 226 and 227. The relay 260 is effective to shunt out either resistance 361 or condenser 250, as will be more apparent from the subsequent description.

A transformer is employed to supply low voltage power to the system, this transformer comprising a line voltage primary 279 connected to suitable line wires 280 and 281 (not shown). The transformer also comprises a secondary coil 282. As in the preferred species, the shaft 214 is provided with a crank member 315 of insulating material which cooperates with limit switches 316 and 317. These limit switches are designed to be opened when the valve reaches extreme positions of its movement.

*Operation of the species of Figures 5 to 8*

Let it be assumed that there is a reduction in temperature in the space in which control potentiometer 290 is located so that the contact arm 295 is deflected by the bimetallic element 296 towards the left. Such action will cause engagement of contact arm 263 with contact 264 so as to cause the following circuit to be established to field winding 226: from the left-hand terminal of secondary 282 through conductors 320 and 321, contact arm 263, contact 264, conductor 323, booster coil 271, conductor 324, limit switch 316, conductor 325, conductor 326, winding 226, and conductors 328 and 285 back to the other terminal of secondary 282. It will be noted that the circuit just established to winding 226 connects the same, with the exception of the booster coil 271 of low impedance, directly across the secondary 282. At the same time, the following circuit is established to field winding 227: from the left-hand end of secondary 282 through conductors 320 and 321, contact arm 263, contact 264, conductor 323, booster coil 271, conductor 324, limit switch 316, conductor 325, resistor 361, conductor 331, condenser 250, conductors 332 and 333, field winding 227, and conductors 328 and 285. The circuit just traced to field winding 227, it will be noted, includes resistor 361 and condenser 250 in series. This circuit parallels in part the following permanent circuit to field winding 227: from the left-hand end of secondary 282 through conductors 320 and 330, resistance 362, conductor 331, condenser 250, conductors 332 and 333, field winding 227, and conductors 248, 328, and 285 to the other terminal of secondary 282. The various relations of these circuits will be most clearly shown in Figure 6 where it will be apparent that field winding 227 is energized by condenser 250 in series with resistors 361 and 362 in parallel. Due to the fact that the resistors 361 and 362 are connected in parallel, the effect thereof is appreciably reduced. Thus winding 226 is connected substantially directly to the source of power whereas winding 227 is connected in series with a condenser and a relatively small resistance to the source of power. The motor is thus able to operate as an ordinary condenser motor and develops a torque which rotates shaft 214 in a clockwise direction to open the valve and to simultaneously move the arm 299 of the rebalancing potentiometer 292 in a direction to rebalance the energization of relay 260.

When this rebalance in the energization of relay 260 is accomplished, the contact arm 263 is moved out of engagement with contact 264 so as to interrupt the circuit previously traced to field winding 226 and at the same time interrupt one of the circuits previously traced to field winding 227. The result is that now the only energizing circuit for field winding 227 is the second traced of the two circuits and the energizing field winding for 226 is as follows: from the left-hand terminal of secondary 282 through conductors 320 and 330, resistance 362 and 362, conductor 326, field winding 226 and conductors 328 and 285 to the other terminal of secondary 282. The connection of the various elements will now be as shown in the diagram of Figure 7. In other words, the resistance 362 will be in series with both field windings 226 and 227 whereas resistor 361 will be in series with only field winding 226 and condenser 250 only in series with field winding 227. The resistance 362 has as its sole effect a reduction in the torque of the motor by reducing the current supplied to the windings. The resistor 361 both reduces the torque by reducing the current supplied to winding 226 and also decreases the phase displacement between the currents through windings 226 and 227. The effect of this reduction in phase displacement is the same as in the preferred species, namely, that the torque is not only further reduced but that there are now components of the current of the two windings which are in phase with each other. These inphase components are effective to produce a locking action previously described so that the valve 210 is firmly held in its new position.

Let it be assumed now that with the valve open the temperature begins to rise again so that the arm 295 is deflected to the right causing an unbalance in the energization of relay 260 in the opposite direction so as to cause contact arm 263 to engage contact 265. When this takes place, the following circuit is established to field winding 227: from the left-hand terminal of transformer 282 through conductors 320 and 321, contact arm 263, contact 265, conductor 341, booster coil 270, conductor 342, limit switch 317, conductor 343, conductor 333, field winding 227 and conductors 248, 328, and 285 to the other terminal of secondary 282. It will be noted that with the exception of booster coil 270 the field winding 227 is connected directly across secondary 282. At the same time, the following circuit is established to field winding 226 which parallels in part the circuit traced to this field winding in connection with the neutral position of contact blade 263: from secondary 282, through conductors 320 and 321, contact blade 263, contact 265, conductor 341, booster coil 270, conductor 342, limit switch 317, conductor 343, conductor 332, condenser 250, conductor 331, resistance 361, field winding 226 and conductors 328 and 285 to the other terminal of secondary 282.

The relation of these various circuits of field windings 226 and 227 is most clearly indicated in the diagram of Figure 8. It will be noted from this figure that field winding 227 is substantially connected across the source of power whereas field winding 226 is connected across the source of power in series with resistance 361 and with resistance 362 and condenser 250 in parallel. As was mentioned earlier, the species of Figures 5 to 8 is particularly adaptable to the situation in which in order to reduce the torque sufficiently to get a sufficiently small holding action, it is necessary to use such a large resistor that insufficient torque would be available for running the motor in the opposite direction as a resistance motor. It will be noted that in the diagram of Figure 8 the resistance in series with field winding 226 is considerably less than the combined resistance values of resistors 362 and 361. This is due to the fact that condenser 250 is placed in parallel with resistor 362. This has a twofold effect. In the first place, the paralleling of resistor 362 with condenser 250 reduces the effect of the impedance of the pair so as to increase decidedly the current flowing to field winding 226. At the same time, due to the connection of condenser 250 in series with field winding 226, the phase position of the current through field winding 226 is considerably more advanced than if such advance in the phase position were due solely to the resistors 361 and 362. Thus, the connection of condenser 250 in parallel with resistor 362 both increases the current to field windings 226 and also increases the phase shift between windings 226 and 227 so as to cause a much larger torque in the opposite direction. As a matter of fact, the motor, when returning, is not operating as a true resistance motor but rather as a combination of a resistance and a capacitor motor.

It is to be noted that whether the motor is lifting or returning, the opening of the respective limit switch causes the connections to assume the form shown in Figure 7 wherein the valve or other operated element is held firmly against movement.

It will be readily seen that the present invention provides an improved method of holding a load in a desired position with a split phase motor. It will further be seen that this is accomplished by an extremely simple arrangement wherein the elements thereof are employed in different positions of the switch to perform several functions.

It is to be understood that while a certain specific embodiment of the invention has been shown, this is for purposes of illustration only and that the invention is limited only by the scope of the appended claims.

I claim as my invention:

1. In control apparatus of the class described, an element to be operated, means biasing said element towards a predetermined extreme position, a reversible electric motor connected to said element, said motor having two field windings, a single phase source of power, and controlling means including a switch and phase displacing means for selectively energizing said motor with different amounts and directions of phase displacement, said means being effective in one position of said switch to cause said motor to be energized with the amount of and the extent and direction of phase displacement of the current such that the motor moves the operator against its bias, said controlling means being effective in another position of said switch to cause said motor to be energized with a phase displacement in the same direction but of lesser magnitude such that the combined actions of the reduced torque and of the resistance to turning of the motor caused by the components of the currents through the two windings in phase with each other are effective to cause said operated element to be held immovable against the action of said biasing means, and said controlling means being operative in a third position of said switch to cause said motor to be energized with a phase displacement less than and opposite to that occurring with the first position of the switch whereby said motor cooperates with said biasing means to move said element back towards said predetermined extreme position.

2. In control apparatus of the class described, an element to be operated, means biasing said element towards a predetermined extreme position, a reversible electric motor connected to said element, said motor having two field windings, a single phase source of power, controlling means including a switch and phase displacing means for selectively energizing said motor with different amounts and directions of phase displacement, said means being effective in one position of said switch to cause said motor to be energized with the amount of and the extent and direction of phase displacement of the current such that the motor moves the operator against its bias, said controlling means being effective in another position of said switch to cause said motor to be energized with a phase displacement in the same direction but of lesser magnitude such that the combined actions of the reduced torque and of the resistance to turning of the motor caused by the components of the currents through the two windings in phase with each other are effective to cause said operated element to be held immovable against the action of said biasing means, and said controlling means being operative in a third position of said switch to cause said motor to be energized with a phase displacement less than and opposite to that occurring with the first position of the switch whereby said motor cooperates with said biasing means to move said element back towards said predetermined extreme position, and means jointly controlled by a controlling condition and by the position of said operated element for controlling the position of said switch.

3. In combination, an element to be operated, means biasing said element towards a predetermined extreme position, a reversible capacitor motor, said motor having a pair of field windings, a single phase source of power, a condenser, a resistor, means connecting said windings to said source of power, one winding being in series with said condenser and the other in series with said resistor, connecting means between said motor and said element, said motor and said connecting means being effective when the motor is thus energized to hold said element in any selected position against the action of its biasing means, and means for selectively shunting either said condenser or said resistor when it is desired to move said element away from or toward said predetermined position, respectively.

4. In combination, an element to be operated, means biasing said element towards a predetermined extreme position, a reversible capacitor motor, said motor having a pair of field windings, a single phase source of power, a condenser, a resistor, means connecting said windings to said source of power, one winding being in series with said condenser and the other in series with said resistor, connecting means between said motor and said element, said motor and said connecting means being effective when the motor is thus energized to hold said element in any selected position against the action of its biasing means, means including a switch for selectively shunting either said condenser or said resistor when it is desired to move said element away from or toward said predetermined position, respectively, and means controlled by both a controlling condition and by the position of said operated element for controlling the position of said switch.

5. In combination, an element to be operated, means biasing said element towards a predetermined extreme position, a reversible capacitor motor, said motor having a pair of field windings, a single phase source of power, a condenser, a resistor, means connecting said windings to said source of power, one winding being in series with said condenser and the other in series with said resistor, connecting means between said motor and said element, said motor and said connecting means being effective when the motor is thus energized to hold said element in any selected position against the action of its biasing means, means including a switch for selectively shunting either said condenser or said resistor when it is desired to move said element away from or toward said predetermined position, respectively, and further means operative upon said element reaching either one of two extreme positions to interrupt the shunt then in effect so as to terminate further movement of said element.

6. In combination, an element to be variably positioned, means biasing said element towards a predetermined extreme position, a reversible capacitor motor, means connecting said motor and said element, said motor having a pair of field windings, a single phase source of power, a condenser, first and second resistors, controlling means including a switch operative in a first position of said switch to connect said windings to said source of power, one winding in series with said condenser and with said resistors in parallel and the other winding independently of said condenser and resistors, to cause said motor to move said element against its bias, said controlling means being operative in a second position of said switch to connect said windings to said source of power, said one winding in series with said condenser and one of said resistors and said other in series with both of said resistors, to cause said motor to hold said element against its bias, and said controlling means being operative in a third position of said switch to connect said windings to said source of power, said one winding being connected independently of said condenser and resistors and said other winding in series with one of said resistors and with said condenser and the other of resistors in parallel, to cause said motor to return said element towards the position towards which it is biased.

7. In control apparatus of the class described, an element to be operated, means biasing said element towards a predetermined extreme position, a reversible electric motor connected to said element, said motor having two field windings, a single phase source of power, controlling means including a switch and phase displacing means for selectively energizing said motor with different amounts and directions of phase displacement, said means being effective in one position of said switch to cause said motor to be energized with the amount of and the extent and direction of phase displacement of the current such that the motor moves the operator against its bias, said controlling means being effective in another position of said switch to cause said motor to be energized with a phase displacement in the same direction but of lesser magnitude such that the combined actions of the reduced torque and of the resistance to turning of the motor caused by the components of the currents through the two windings in phase with each other are effective to cause said operated element to be held immovable against the action of said biasing means, and said controlling means being operative in a third position of said switch to cause said motor to be energized with a phase displacement less than and opposite to that occurring with the first position of the switch whereby said motor cooperates with said biasing means to move said element back towards said predetermined extreme position, and limiting means operative independently of said switch upon said element reaching an extreme position in either direction to cause said motor to be energized in the same manner as when said switch is in said intermediate position.

8. In control apparatus of the class described, an element to be operated, means biasing said element towards a predetermined position, an electric motor connected to said element, said motor having two field windings, a single phase source of power, controlling means including a switch and phase displacing means for controlling the energization of said motor, said controlling means being operative in one position of said switch to cause said motor to be energized with the amount of and the extent and direction of phase displacement of the current through the windings such that the motor moves said element against its bias, said controlling means being effective in another position of said switch to cause said motor to be energized with a phase displacement in the same direction but of lesser magnitude such that the combined actions of the reduced torque and of the resistance to turning of the motor caused by the components of the currents through the two windings in phase with each other are effective to cause said operated element to be held immovable against the action of said biasing means, and said biasing means being effective in the event of said motor being completely deenergized to move said element to said predetermined position.

9. In control apparatus of the class described, an element movable between two extreme positions, means biasing said element toward one of said extreme positions, an electric motor connected to said element, said motor having two field windings, a single phase source of power, controlling means including a switch and phase displacing means for controlling the energization of said motor, said controlling means being operative in one position of said switch to cause said motor to be energized with the amount of and the extent and direction of phase displacement between the current through the windings such that the motor moves said element against the action of said biasing means towards said other extreme position, a second switch, means associated with said motor and operative on said element reaching said other extreme position to change the position of said second switch, and means including said second switch operative upon the position of said second switch being so changed to reduce the phase displacement between the current through said windings such that the combined action of the reduced torque and of the resistance to turning of the motor caused by the components of the two currents through the two windings in phase with each other are effective to cause said element to be held in said other extreme position against the action of said biasing means, said biasing means being effective in the event of said motor being completely deenergized to move said element to said first mentioned position.

10. In combination, a device biased to one extreme position, a capacitor motor connected to said device for moving the same away from said biased position, said motor comprising a pair of field windings and means for connecting the capacitance of said motor in series with one of said windings when it is desired that said motor move said device against its bias, a resistance, and means operative when said device is moved to its other extreme position to connect said resistance in series with the other of said windings to both reduce the current through said other winding and decrease the phase displacement between the currents through the two windings.

11. In combination, a device biased to one extreme position, a capacitor motor connected to said device for moving the same away from said biased position, said motor comprising a pair of field windings and means for connecting the capacitance of said motor in series with one of said windings when it is desired that said motor move said device against its bias, a resistance, and means operative when said device is moved to its other extreme position to connect said resistance in series with one of said windings to both reduce the current through said winding and decrease the phase displacement between the currents through the two windings.

LE ROY A. GRIFFITH.